United States Patent [19]

Ljubimov et al.

[11] 4,270,349
[45] Jun. 2, 1981

[54] DISTRIBUTING DEVICE OF VEHICLE HYDRAULIC CONTROL SYSTEM

[76] Inventors: Boris A. Ljubimov, Verkhnyaya ulitsa, 18, kv. 30, Moscow; Evgeny N. Chervyakov, Mozhaiskoe shosse, 38, kv. 36, Odintsovo Moskovskoi oblasti; Jury I. Sudakov, ulitsa akademika Komarova, 10, kv. 45; Iraida S. Pogorelova, Uralskaya ulitsa, 5, kv. 138, both of Moscow; Petr Y. Pritsker, prospekt Lenina, 39, kv. 11, Minsk; Igor I. Kandrusev, ulitsa D. Serdina, 24, kv. 45, Minsk; Zilek B. Liberfarb, ulitsa Karla Marxa, 25, kv. 41, Minsk; all of U.S.S.R.

[21] Appl. No.: 886,773

[22] Filed: Mar. 14, 1978

[51] Int. Cl.³ .............................................. F16D 31/02
[52] U.S. Cl. .......................................... 60/384; 60/386; 180/132
[58] Field of Search ................. 60/384, 385, 386, 387, 60/400, 402; 180/132, 146, 147; 417/486, 501

[56] References Cited

U.S. PATENT DOCUMENTS

| | | | |
|---|---|---|---|
| 3,411,294 | 11/1968 | Hedermann | 60/386 |
| 3,452,543 | 7/1969 | Goff et al. | 60/402 X |
| 3,584,985 | 6/1971 | Baatrup | 180/146 |
| 4,057,007 | 11/1977 | Denker | 91/501 |

FOREIGN PATENT DOCUMENTS 1240417  5/1967  Fed. Rep. of Germany.

Primary Examiner—Irwin C. Cohen
Attorney, Agent, or Firm—Haseltine and Lake

[57] ABSTRACT

The distributing device of a vehicle hydraulic control system comprises a distributor connected via hydraulic lines to a servomotor, a pump and a tank, the control member of the distributor being mechanically connected with the steering drive shaft, and further includes a hydraulic machine connected via hydraulic lines with the hydraulic distributor, the rotary member of this machine being adapted to vary the volume of the working chambers and being mechanically connected with the actuating member of the hydraulic distributor and with the steering drive shaft, the steering drive shaft being rotatable relative to the rotary member of the hydraulic machine within an angular play value providing for the preset displacement of the control member of the hydraulic distributor. The hydraulic machine has two cylinder blocks with respective pistons, wherein the cylinders are arranged circumferentially in opposing pairs, the working chambers of the opposingly arranged cylinders communicating with each other and communicating with the hydraulic distributor, the rotary member of the hydraulic machine being arranged between the cylinder blocks and including a disc with profile cams provided on its opposite end face surfaces, the cams being arranged in opposing pairs for cooperation with the respective pistons.

3 Claims, 7 Drawing Figures

DISTRIBUTING DEVICE OF VEHICLE HYDRAULIC CONTROL SYSTEM

DESCRIPTION OF THE INVENTION

The present invention relates to hydraulic devices and, more particularly, it relates to the distributing devices of the hydraulic steering or control systems of vehicles.

FIELD OF THE INVENTION

A distributing device constructed in accordance with the present invention can be utilized to utmost advantage in wheel tractors and self-propelled agricultural and road-building machines.

However, the herein disclosed distributing device can be incorporated in vehicles of other kinds, e.g. in ships and in high-capacity trucks.

The herein disclosed distributing device can be used for controlling various units and members of a vehicle, e.g. for controlling work-preforming member actuating motors.

PRIOR ART AND ITS DISADVANTAGES

There are known distributing devices of the hydraulic control systems of vehicles. These distributing devices comprise as their components a hydraulic distributor connected via hydraulic lines with a servomotor, a pump and a tank, and a hydraulic machine connected via hydraulic lines with hydraulic distributor. The hydraulic distributor has booster spaces controlling the motion of the actuating or control member under the action of the pressure supplied by the hydraulic machine. The hydraulic machine has its rotary member rigidly connected with the steering drive shaft, the rotary member being adapted to vary the volume of the working chambers. The hydraulic machine has a cylinder block with pistons arranged circumferentially in a single row. The rotary member of the hydraulic machine includes a disc having on one end face surface thereof a profiled cam cooperating with the pistons. The hydraulic machine has its own distributor adapted to distribute the liquid flows coming from the working chambers of the cylinders.

However, the above-specified distributing devices of the prior art are not adequately compact and have relatively great overall dimensions and weight. They are, moreover, incapable of offering sufficiently easy steering of the vehicle, particularly, when the vehicle is heavy and bulky.

There are other known distributing devices of vehicle hydraulic control systems. Devices of this kind include a hydraulic distributor communicating via hydraulic lines with a servomotor, a pump and a reservoir, and a hydraulic machine connected via hydraulic lines with the hydraulic distributor. The actuating or control member of the hydraulic distributor is mechanically connected with the steering drive shaft. The hydraulic machine has its rotary member mechanically connected with the steering drive shaft and with the control member of the hydraulic distributor, the rotary member being adapted to vary the volume of the working chambers. The steering drive shaft is rotatable relative to the rotary member of the hydraulic machine within an angular play value providing for the preset displacement value of the actuating member of the distributor.

The hydraulic machine has a planetary gear couple made of a stationary internal gear and a movable externally-toothed satellite pinion. The movable pinion is accommodated within the stationary internal gear and is operatively connected with the steering drive shaft and with the actuating member of the distributor with aid of a three-dimensional linkage of the universal-joint transmission type.

These last described distributing devices are free from the disadvantages inherent in the first-described type of the distributing devices; however, their manufacture is complicated and costly, to say nothing of the necessity of mounting the hydraulic machine behind the distributor and of having the three-dimensional operative connection of the universal-joint type.

This notwithstanding, we consider the distributing device of the last-described type as the prior art closest to the present invention.

OBJECTS AND BRIEF DESCRIPTION OF THE INVENTION

It is the main object of the present invention to provide a distributing device of a vehicle hydraulic control system, wherein the hydraulic machine should be of a structure providing for making the whole device more compact and lightweight.

It is another object of the present invention to provide for easy steering of the vehicle.

It is still another object of the present invention to simplify the manufacture of the distributing device.

With these and other objects in view, there is herein disclosed a distributing device of a vehicle hydraulic control system, comprising a hydraulic distributor communicating via hydraulic lines with a servomotor, a pump and a tank, the control member of this hydraulic distributor being mechanically connected with the steering drive shaft, and a hydraulic machine communicating via hydraulic lines with the hydraulic distributor, of which the rotary member adapted to vary the volume of the working chambers is mechanically connected with the control member of the hydraulic distributor and with the steering drive shaft, the steering drive shaft being rotatable relative to the rotary member of the hydraulic machine within an angular play value providing for the preset value of the displacement of the control member of the hydraulic distributor, in which device, in accordance with the present invention, the hydraulic machine has two cylinder blocks wherein the pistons are arranged circumferentially in opposing pairs, the working chambers of the opposingly arranged cylinders communicating with each other and being connected with the distributor, the rotary member of the hydraulic machine being accommodated intermediate of the cylinder blocks and including a disc with profiled cams provided on the opposite end faces thereof, the cams being arranged in opposing pairs for cooperation with the respective pistons.

It is expedient that the hydraulic machine be mounted on the steering shaft intermediate of the steering wheel and the distributor, in which case the steering shaft serves as the member supporting the disc of the hydraulic machine.

This arrangement of the hydraulic machine simplifies the connection of its rotary member, i.e. of the disc with the steering drive shaft and obviates the need in an individual supporting member for the disc; furthermore, it provides for more simple arrangement of the hydraulic lines connecting the hydraulic distributor with the pump, the servomotor and the tank.

It is not less expedient for the spaces defined between the cylinder blocks of the hydraulic machine and at the end faces of the control member of the hydraulic distributor to be connected to the hydraulic pressure line connecting the pump with the servomotor.

The above connection enables to relieve the disc of the hydraulic machine from relatively great efforts developed at its interaction with the pistons, and thus to enhance the reliability of the performance of the distributing device.

A distributing device for a vehicle hydraulic control system, constructed in accordance with the present invention, is simple in manufacture, compact, lightweight and of relatively small overall dimensions, while offering a relatively high efficiency factor.

BRIEF DESCRIPTION OF THE DRAWINGS

Given below is a description of an embodiment of the present invention, with reference being had to the accompanying drawings, wherein.

DETAILED DESCRIPTION OF THE INVENTION

Figure 1:
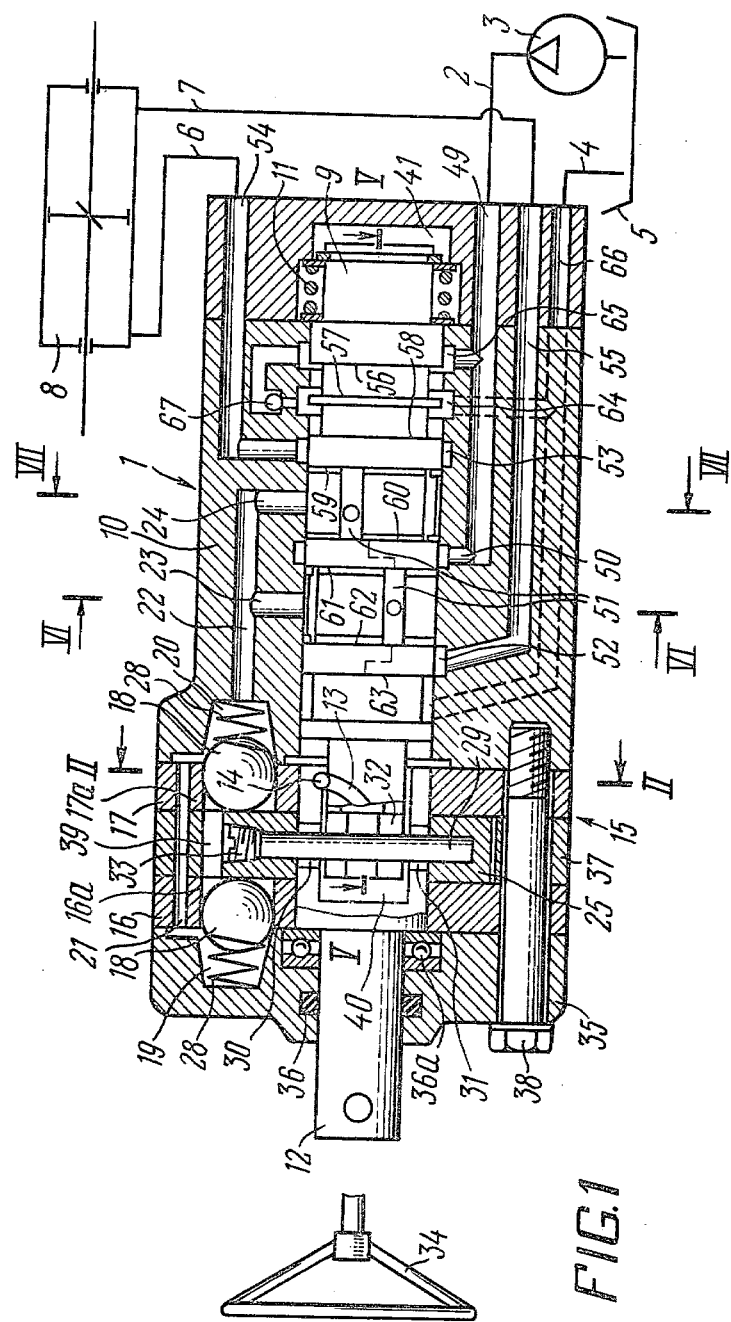
FIG. 1 illustrates the structure of the distributing device and the pattern of its connections with the pump, the tank and the servomotor.

In the drawings, the distributing device of a vehicle hydraulic control system comprises a hydraulic distributor 1 (FIG. 1), to be hereinafter referred to for brevity sake as "distributor 1," connected via a hydraulic line 2 with a pump 3, via a hydraulic line 4 with a tank 5, and via hydraulic lines 6 and 7 with the respective spaces of a servomotor 8 which in the presently described embodiment is a hydraulic cylinder. The actuating or control member of the distributor 1 is in the form of a slide or spool valve 9 received in a housing 10 and provided with a return spring 11. The spool valve 9 is operatively connected with the steering shaft 12 of the vehicle via a screw-and-ball transmission including a helical groove 13 made in the body of the spool valve 9 and a ball 14 fast with the steering shaft 12.

Figure 2:
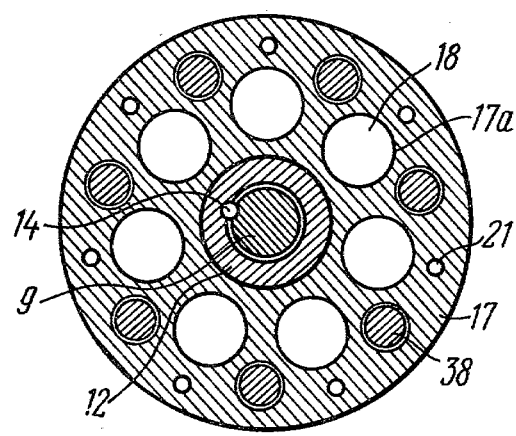
FIG. 2 is a sectional view taken on line II—II of FIG. 1.

The distributing device further comprises a hydraulic machine 15 with two cylinder blocks 16 and 17. The cylinders 16a, 17a of the blocks 16 and 17 are uniformly circumferentially arranged and receive therein reciprocable pistons 18 in the form of balls. The cylinders 16a, 17a and the pistons 18 of the two cylinder blocks 16, 17 are arranged in opposing pairs uniformly circumferentially spaced, as it can be seen in FIG. 2.

Figure 3:
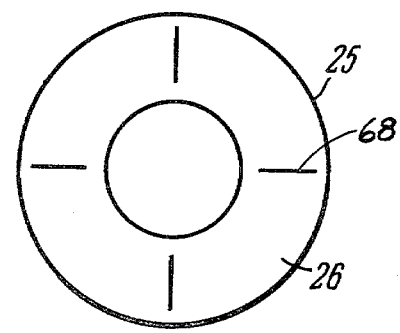
FIG. 3 is a front elevation of the disc of the hydraulic machine.
Figure 4:
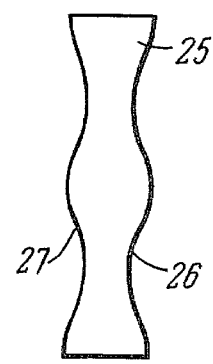
FIG. 4 is a side view of the same disc.
Figure 5:
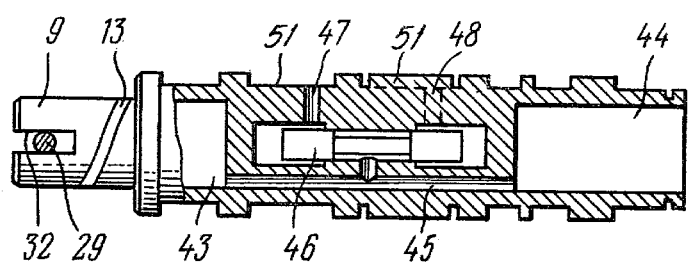
FIG. 5 is a sectional view taken on line V—V of FIG. 1.

In the presently described embodiment, each cylinder block 17 (16) has seven cylinders 17a (16a). The working chambers 19 (FIG. 1) and 20 of the opposing pairs of the cylinders 16a and 17a communicate with each other via a passage 21 and are connected with the distributor 1 via openings 22, 23, 24. The rest of the working chambers arranged in the opposing pairs are connected in the same manner. Received intermediate of the cylinder blocks 16 and 17 is a disc 25 having on its opposing end face surfaces profiled cams 26 (FIG. 3), 27 (FIG. 4) which are circumferentially spaced for cooperation with the respective pistons 18. The pistons 18 are spring-urged by compression springs 28 (FIG. 1). The disc 25 with its profiled cams 26, 27 is adapted to vary the volume of the working chambers 19, 20 of the cylinders 16a, 17a, as the disc is rotated. The disc is operatively connected with the spool valve 9 and with the steering shaft 12, with aid of a stud 29 mounted in a radial hole of the disc 25 and extending through openings 30, 31 of the shaft 12 and through a slot 32 of the spool valve 9. The stud 29 is received in the holes 30 and 31 with a clearance or play permitting the rotation of the steering shaft 12 relative to the disc 25 within the limits defined by this play, and thus permitting the predetermined motion of the spool valve 9. The stud 29 is retained in the axial direction by a closure 33. The hydraulic machine 15 is mounted on the steering shaft 12 intermediate of the distributor 1 and the steering wheel 35, the shaft 12 of the steering drive acting as the support of the disc 25. The hydraulic machine is closed with a lid 35 wherein the seals 36 of the shaft 12 and a bearing 36a are mounted. Interposed between the cylinder blocks 16 and 17 is a spacer 37 with the ducts or passages 21 made therethrough to connect the working chambers 19 and 20. The cylinder blocks 16, 17, the spacer 37, the lid 35 and the housing 10 of the distributor 1 are held together by bolts 38. The space 39 of the hydraulic machine 15, defined between the cylinder blocks 16 and 17, is connected to spaces 40 and 41 at the end faces of the spool valve 9 through gaps left between the disc 25 and the cylinder blocks 16, 17, the gaps between the disc 25 and the shaft 12, the openings 30, 31, the slot 32 and openings 43 (FIG. 5), 44 and 45 in the spool valve 9. The opening 45 is connected via a valve 46 and openings 47, 48 to a pressure line connecting the pump 3 to the servomotor 8. This pressure line includes the hydraulic line 2, a duct 49 and a bore 50 in the housing 10, longitudinal slots 51 extending in two rows and circumferentially uniformly spaced about the spool valve 9, the openings 23, 24, 22, the working chambers 19, 20 of the cylinder blocks and, selectively, bores 52, 53, ducts 54, 55 and the hydraulic lines 6 and 7. To provide for distributing the flow of the working liquid from the pump 3 to the servomotor 8 and to drain into the tank 5, as well as to the working chambers 19, 20 of the hydraulic machine 15, the spool valve 9 has reduced-diameter portions and working shoulders defining the working edges 56, 57, 58, 59, 60, 61, 62, 63, while the housing 10 has counterbores 50, 52, 53, 64, 65 and ducts or passages 49, 54, 55, 66. A check valve 67 is provided between the counterbores 64 and 65 to permit the flow of the liquid from the counterbore 64 into the counterbore 65 with the pump 3 not operating.

Figure 6:
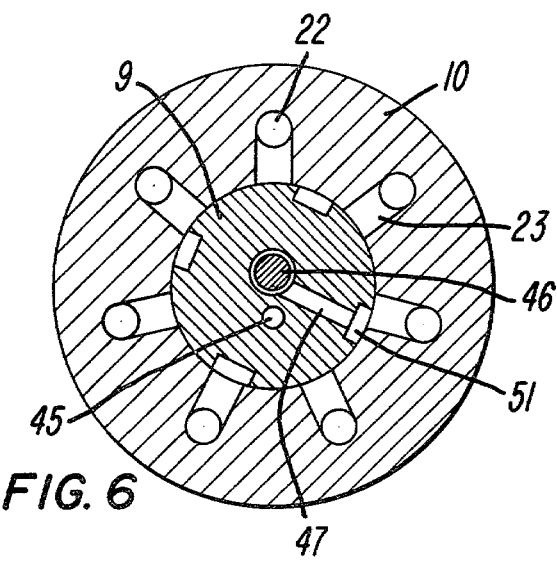
FIG. 6 is a cross-sectional view of FIG. 1 taken along line VI—VI.
Figure 7:
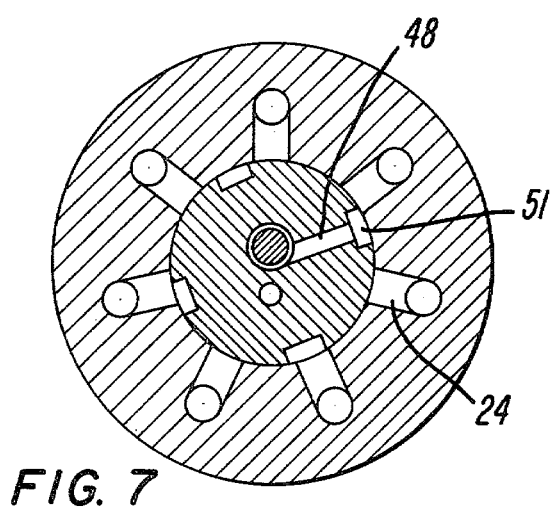
FIG. 7 is a cross-sectional view of FIG. 1 taken along line VII—VII.

To provide for the distribution of the liquid flows to chambers 19 and 20 of the hydraulic machine 15, two rows of slots 51 extend circumferentially uniformly spaced about the spool valve 9. One row of slots is disposed between the edges 61 and 62 of the spool valve 9, whereas, the other row of slots is disposed between edges 59 and 60 of spool valve 9. One row of slots 51 is set with respect to the other row of slots at an angle of 45° (FIG. 6 and FIG. 7). The number of slots 51 of each row is in line with the number of lobes 68 on each profiled cam 26 (FIG. 3) and 27 (FIG. 4) and amounts to four. The slots 51 are set with respect to profiled cams 26 and 27, so that one row of slots 51 is turned to the right relative to the cam lobes 68 by an angle of 22°-30″, whereas the other row of slots 51 is turned to the left relative to the cam lobes 68 by an angle of 22°-30'.

The herein disclosed hydraulic distributing device for the vehicle hydraulic control system operates, as follows.

With no control action exerted onto the steering wheel 34, the shaft 12 does not rotate, and the action of the return spring 11 holds the spool valve 9 in a neutral position, with the working liquid coming from the pump 3 freely flowing to drain into the tank 5 via the duct 49, the counter-bore 65, the slits opened by the working edges 56, 57, the counterbore 64, the duct 66 and the hydraulic line 4. With the spool valve 9 in the neutral position, the edges 58, 59, 60, 61, 62 and 63 provide for closing-off of the spaces of the sevomotor 8 and of the working chambers 19, 20 of the cylinder blocks 16, 17. The valve 46 is in this case in either position, and the check valve 67 is closed.

With a control action applied to the steering wheel 34, the shaft 12 rotates relative to the disc 25, and the interaction of the ball 14 with the helical groove 13 moves the spool valve 9 axially in either direction, depending on the direction of the rotation of the steering shaft 12. Presuming that the spool valve 9 is thus displaced to the right in the drawing, the slits defined between the working edges 61, 63 and 69 of the valve 9 and the housing 10 open, and the edge 57 closes off the free flow of the working liquid into the tank 5. Consequently, the flow of the working liquid under pressure is fed via the duct 49 and the counterbore 50 to the series of the slots 51 disposed in the drawing to the left of the counterbore 50. The liquid then flows from the slots 51 into the openings 23 communcating with this series of the slots and therefrom via the openings 22 into the corresponding working chambers 19, 20 of the cylinder blocks 16, 17, whereby the respective ball-shaped pistons 18 move toward each other. The interaction of these pistons 18 with the profiled cams 26, 27 of the disc 25 rotates the latter in the direction of the rotation of the shaft 12. The other working chambers 19, 20 of the cylinder blocks 16, 17, not connected with the left-hand series of the slots 51, communicate with the series of the slots 51 to the right of the counterbore 50, so that the ball-shaped or spherical pistons 18 in these last-mentioned working chambers 19, 20 move apart, forcing the working liquid from these chambers 19, 20 through the respective openings 22, 24, the right-hand series of the slots 51, the counterbore 53, the duct 54 and the hydraulic line 6 into the internal space of the servomotor 8, causing the displacement of its actuating member, e.g. of its piston and the response of the mechanism associated therewith, e.g. of the steered wheels of the vehicle. From the opposite working space or chamber of the servomotor 8 the working liquid flows into the tank via the hydraulic line 7, the duct 55, the counterbore 52 and the duct 66. Simultaneously with the rotation of the disc 25, owing to the interaction of the stud 29 with the slot 32, there takes place the rotation of the spool valve 9, which provides for the distribution of the flows of the working liquid among the working chambers 19, 20 in accordance with the direction of the motion of the pistons 18, determined by the profile of the cams 26, 27 of the disc 25. The rotation of the spool valve 9, owing to its operative connection of the helical lead screw type with the shaft 12, results in the displacement of the spool valve 9 in the opposite direction and the reduction of the value of the flow of the working liquid supplied into the hydraulic machine 15, and of the speed of rotation of the disc 25. This displacement is continued until the value of the flow reduces so that the speed of the rotation of the disc 25 equals that of the steering shaft 12. Therefore, the feed of the working liquid into the servomotor 8 would also correspond to the speed of the rotation of the steering shaft 12.

As it can be seen from the description, the hydraulic machine 15 operates in the motor mode, providing both for the rotation of the spool valve 9 and the feed of the working liquid into the servomotor 8. Owing to the pressure losses in the hydraulic machine, i.e. to the pressure drop thereacross, the pressure in the left-hand series of the slots 51 would be higher than in the right-hand series, whereby the valve 46 of which the end spaces are connected via the openings 47, 48 with these series of the slots 51 is moved to the right, to connect the spaces 39, 40, 41 with the right-hand series of the slots 51. Consequently, the pressure differential across the pistons 18 becomes equal in value to the pressure drop across the hydraulic machine. Owing to this pressure drop or pressure losses being relatively small, the effort of urging the pistons against the cams 27, 26 is likewise small, which enhances the reliability of the performance of the distributing device.

With the pump 3 not operating, the displacement of the spool valve 9 with the shaft 12 rotating is continued until the play in the connection of the stud 29 with the openings 30, 31 is taken up. The ensuing rotation of the shaft 25 causes rotation of the disc 25, and the hydraulic machine is operated in the pump mode, i.e. as a pump driven by the shaft 12 and charging the hydraulic liquid into the hydraulic cylinder 8. The distribution of the working liquid in the housing 10 is effected in this case similarly to the mode where the pump 3 is operating, except the fact that the working liquid is supplied into the hydraulic machine through the drain channel or duct 66 and the check valve 67, owing to the suction developed in the corresponding working chambers by the motion of the pistons 18 under the action of the spring 28. In this case the maximum pressure developed in the hydraulic cylinder is dependent not on the pump output, but on the maximum torque applied by the driver to the steering wheel 34.

With the steering shaft 12 rotated in the opposite direction, the operation is similar to that described hereinabove.

What is claimed is:

1. A hydraulic steering system of a transport vehicle, comprising a hydraulic distributor connected by hydraulic lines to a servomotor, a pump and a tank, and having a hydraulic distributor control member connected by a screw and ball transmission with a steering drive shaft, a hydraulic machine having working chambers, said hydraulic machine connected by hydraulic lines with the hydraulic distributor and employing a rotary member which serves to alter the volume of the working chambers of said hydraulic machine and said rotary machine being further mechanically connected by means with the control member of the hydraulic distributor and with the steering drive shaft for joint rotation and axial displacement of said control member, the steering drive shaft being capable of rotating relative to the rotary member of the hydraulic machine within a gap defining a degree of play ensuring a required displacement of the control member of the hydraulic distributor prior to actuation of said rotary member, and a pressure line connecting said pump with said servomotor, the improvement comprising said hydraulic machine including two cylinder blocks with pistons, whose cylinders are arranged circumferentially in opposing pairs and having working chambers of the oppositely arranged cylinders on one side of the pistons in communication with each other via passage means and coupled in fluid communication with the hydraulic distributor, the rotary member of the hydraulic machine being disposed between the cylinder blocks and comprising a disk having profiled cams arranged in opposing pairs on the opposite end faces of the disk and engaging their respective pistons on the other side of said pistons, said disk being connected with the control member of the hydraulic distributor by means of a pin extending through the steering drive shaft, and the cylinder blocks and the end faces of the control member of the distributing device are formed with interconnected spaces therebetween.

2. An improved distibuting device as set forth in claim 1, wherein the hydraulic machine is mounted between the steering drive shaft and the hydraulic distributor, and the steering drive shaft supports the disk of the hydraulic machine.

3. An improved distributing device as set forth in claim 1, wherein spaces formed between the cylinder blocks of the hydraulic machine and at the end faces of the control member of the hydraulic distributor, are connected to the hydraulic line connecting said pump with said servomotor.

* * * * *